C. BORNMANN.
PIN JOURNAL FOR PHOTOGRAPHIC CAMERAS.
APPLICATION FILED NOV. 14, 1911.
1,029,267.
Patented June 11, 1912.
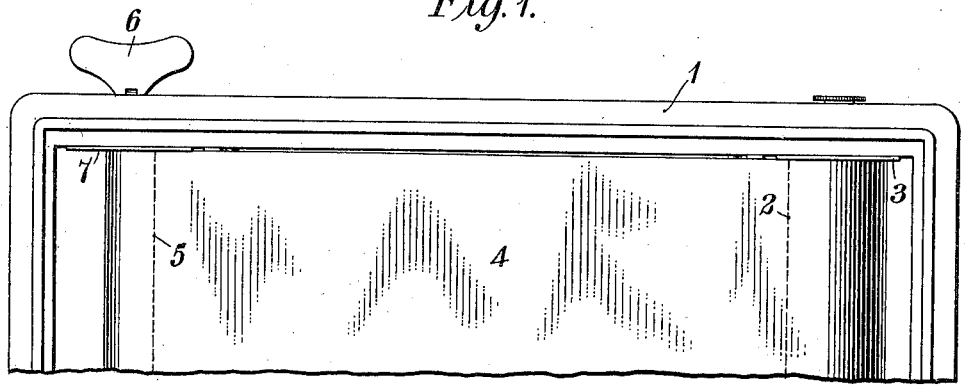
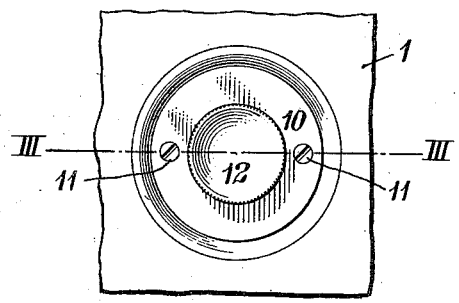
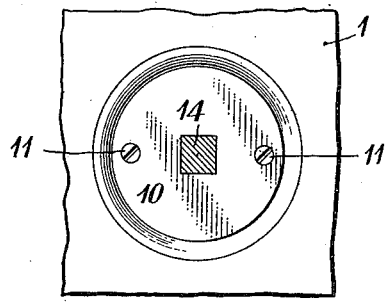
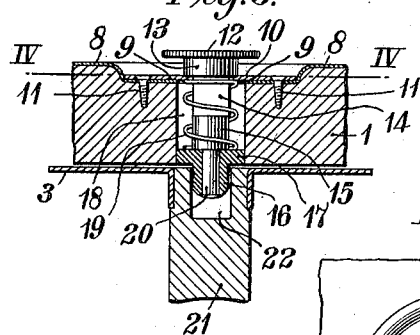
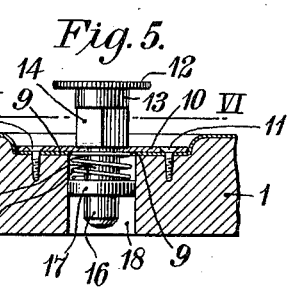
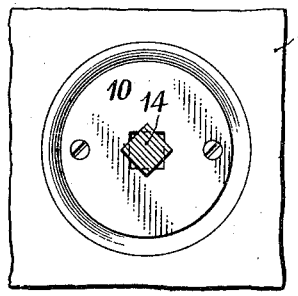
WITNESSES:
C. L. Belcher
F. M. Donshach
INVENTOR
Carl Bornmann.
BY
Phillips Abbott,
his ATTORNEY.

UNITED STATES PATENT OFFICE.

CARL BORNMANN, OF BINGHAMTON, NEW YORK, ASSIGNOR TO ANSCO COMPANY, OF BINGHAMTON, NEW YORK.

PIN-JOURNAL FOR PHOTOGRAPHIC CAMERAS.

1,029,267.  Specification of Letters Patent. Patented June 11, 1912.

Application filed November 14, 1911. Serial No. 660,299.

*To all whom it may concern:*

Be it known that I, CARL BORNMANN, a citizen of the United States, and a resident of the city of Binghamton, county of Broome, State of New York, have invented a new and useful Improvement in Pin-Journals for Photographic Cameras, of which the following is a full, clear, and exact description.

Pin journals for cameras adapted to be retracted for the insertion of the spool have heretofore been made and used in various forms, but all constructions known to me have been defective in one or more particulars or attended with certain inconveniences in use.

It is the purpose of this present invention to provide a pin journal economical of manufacture, compact in structure, (so that it may be applied to small cameras and those in which the walls of the camera box are thin,) reliable in operation and so constructed that it is not liable to get out of order and the detachment and possible loss of the pin is rendered impossible. A special advantage is the fact that the device is so constructed that when retracted by proper manipulation, it will be locked in that position, so that it is not necessary longer to hold on to the pin, and yet may be quickly and easily released, whereupon it will return automatically to its normal position.

Referring to the drawings, Figure 1 illustrates the interior of the rollholding portion of the camera, showing the receiving spool and the stock spool in position and the film extending from one to the other; Fig. 2 illustrates a plan view, or an elevation, depending upon the position of the camera, showing the outwardly presented parts embodied in the invention; Fig. 3 illustrates a sectional view of that which is shown in Fig. 2, taken on the line III—III thereof, showing the pin journal and coacting parts in the inwardly projected position; Fig. 4 illustrates a view taken on the line IV—IV of Fig. 3; Fig. 5 illustrates a view, partly in elevation and partly in section, showing the parts when in the retracted position; Fig. 6 illustrates a plan view, or an elevation, depending upon the position of the camera, and partly in section, taken on the line VI—VI of Fig. 5.

In the drawings, 1 represents the sideboard of the camera box, 2 the stock spool, 3 one of the flanges thereof, 4 the film, 5 the receiving spool, 6 the winding key therefor, 7 one of the flanges of the receiving spool, 8 the leather or other material which usually covers the camera box. As shown, it projects downwardly into a saucer shaped recess within which the outwardly exposed parts of the pin journal are located, so that they may normally be protected by the recess, thus making the apparatus more compact and relieving it of likelihood of injury. The lower part of the recess in the sideboard is made square in outline, as shown, and the edge 9, 9, of the leather or other covering, may be carried down into this squared part or bottom of the recess as shown, so as to be securely held by the plate 10 of the journal mechanism. The plate 10 is firmly held in the bottom of the recess by two screws 11, 11, or in any other preferred manner. The pin journal is made in the form shown, that is to say, on its outer end it is provided with a thumb nut 12, the edges of which are knurled, or otherwise roughened to facilitate turning of the pin. Underneath this knurled head is a circular shoulder 13 and beneath that a squared or angular section 14 and beneath that another smaller cylindrical section 15 and below that the journal proper of the pin 16. This part is provided with an enlarged shoulder 17 which slides through an opening 18 made in the sideboard of the camera.

19 is a spring which at its upper end abuts against the under side of the plate 10 and at its lower end against the enlarged annular shoulder 17.

For convenience in assembling the parts, I prefer to make the terminal part 16 of the pin separate from the pin proper, as illustrated in Fig. 3, so that after the parts are assembled this terminal piece may be pressed on to a projecting stud 20 which may then be slightly headed, as illustrated in Fig. 3, thus riveting it firmly in place.

It will be noted that the cylindrical portion 13 of the pin is larger than the underlying part 14 which is squared from the cylindrical portion, so that there are left upon the square portion shoulders or projecting corners which resting upon the upper surface of the plate 10 when the structure is given a quarter turn act as stops and limit the inward movement of the pin when it is in its retracted position, and when in its projected or inward position the cylindrical part 13 rests down upon the plate 10, thus not only giving a finished appearance, but also covering the hole through which the squared part 14 passes, thus excluding light and dust, all these results being important in a camera. Also it is to be noted that the hole through the plate 10 coincides in shape and substantially in size with the squared or otherwise angular form of the part 14 of the pin, so that while this squared part can slide freely through the hole when in register with it, yet when turned a quarter turn, the projecting corners will overlap the sides of the opening and thus the journal will be supported in its retracted position, as above stated. It will also be noted that the enlarged shoulder 17 on the terminal part 16 of the pin, which fits with some accuracy the opening 18 in the sideboard of the camera, acts as a guide to the pin in addition to acting as an abutment or support for the lower end of the spring. The lower portion of this terminal part acts as the journal proper which enters the hole or other recess made in the spindle of the spool.

In Fig. 3 I illustrate parts of a spool in position. 3 represents the flange, 21 the spindle of the spool and 22 the hole or opening in the spindle within which the terminal end of the pin enters.

The operation is as follows: Assuming a spool to be in position, as illustrated in Fig. 3, to withdraw the spool, the operator takes hold of the cap 12 of the pin and draws it outwardly, thus compressing the spring 19, and withdrawing the end of the pin from the hole in the spool. After the squared portion 14 of the pin has passed entirely through the hole in the plate 10 the pin is turned slightly, say about a quarter turn, on its axis, so that the projecting corners of the squared part shall overlap the edges of the squared hole in the plate 10 as shown in Fig. 6. Thereupon the operator lets go of the head of the pin and the tension of the spring will hold it in its then retracted position indefinitely. The operator then manipulates the spool, as desired, removing the old one and inserting a new one. Thereupon by additional turning of the pin upon its axis, which may be in either direction, the squared or angular section of the pin will again come into proper registration with the similarly shaped hole in the plate, whereupon the spring will automatically cause the pin to pass inwardly, so that it may enter the hole in the end of the spool spindle and act as a journal therefor.

It will be noted, as shown in Fig. 5, that when the pin is retracted, its inner end is withdrawn beyond the line or plane of the inner surface of the sideboard of the camera. It is not essential that it be drawn so far back as that, but it is desirable that it should be at least substantially flush therewith.

It will be obvious to those who are familiar with this art that modifications may be made in the details of construction of the parts without departing from the essentials of the invention. I therefore do not limit myself to the details shown and described, as they are one form only in which the invention may be embodied.

I claim:

1. A pin journal for cameras embodying a perforated plate adapted to be fastened to the camera, a pin having a head upon its outer end whereby it may be withdrawn and rotated on its axis, a cylindrical part beneath the head, an angular part beneath the cylindrical part, a reduced part beneath the angular part, both of said last-named parts adapted to slide through the opening in the plate, a terminal part on the inner end of the pin adapted to engage with a cartridge spool and a spring adapted to normally press the pin inwardly.

2. A pin journal for cameras embodying a plate adapted to be fastened to the camera and provided with an opening, a pin having means upon its outer end whereby it may be withdrawn and rotated on its axis, a section adjoining said means adapted to cover and close the opening, means upon the pin whereby when withdrawn and partly turned, it may be held in its retracted position, a device upon the inner end of the pin adapted to engage a cartridge spool, and a spring which normally presses the pin inwardly.

In testimony whereof I have signed my name to this specification in the presence of two subscribing witnesses.

CARL BORNMANN.

Witnesses:
GEO. W. TOPLIFF,
A. DEICHELMANN.